Patented July 18, 1944

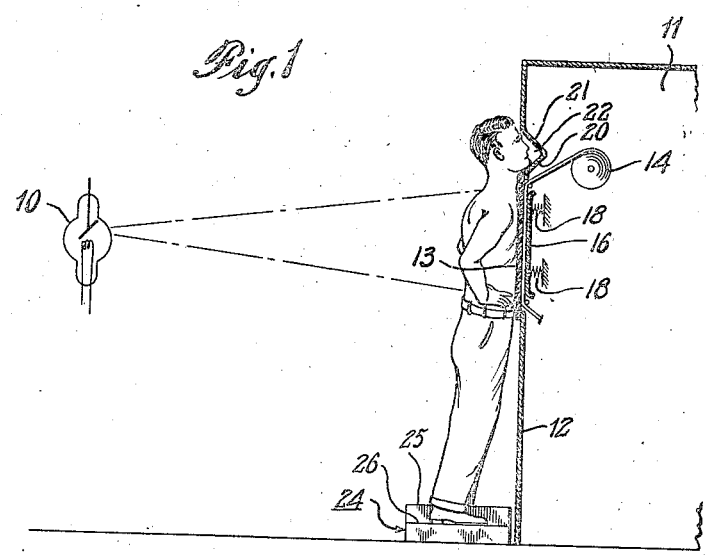
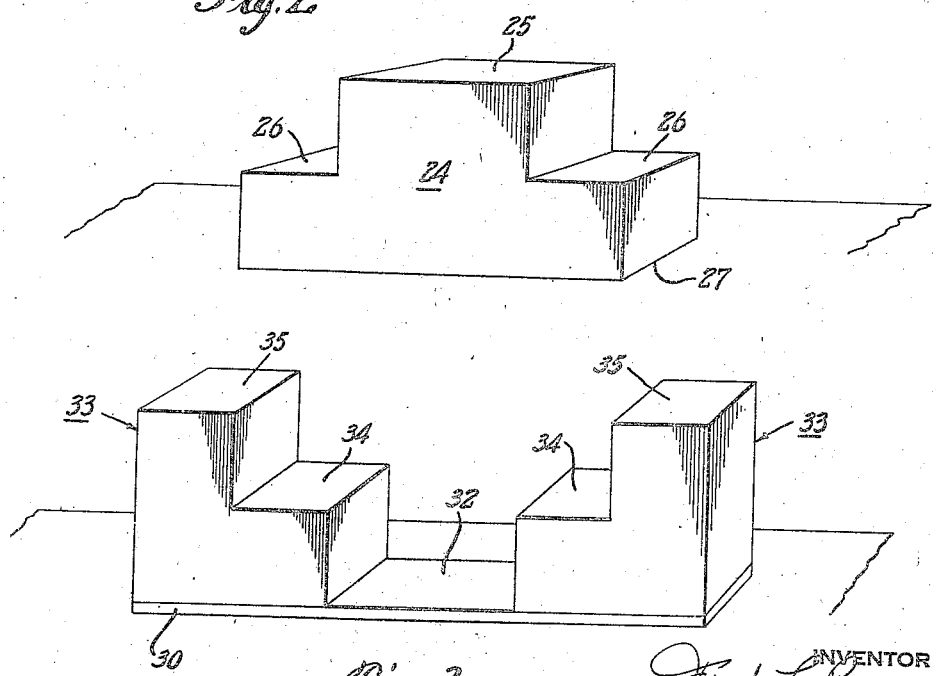

2,353,969

UNITED STATES PATENT OFFICE 2,353,969

X-RAY APPARATUS

Frank T. Powers, Glen Cove, N. Y.

Application April 11, 1941, Serial No. 388,009

5 Claims. (Cl. 250—50)

The present invention relates to X-ray apparatus and more particularly to novel and useful improvements in radiographic apparatus suitable for chest survey work.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrate one embodiment of the invention, and together with the description, serve to explain the principles of the invention.

Of the drawing:

Figure 1 is a diagrammatic view, partly in section, of radiographic apparatus utilizing the preferred embodiment of the present invention;

Figure 2 is a perspective view of the preferred embodiment of the present invention; and Figure 3 is a similar perspective view of a modified embodiment of the present invention.

The present invention has for its object the provision of new and useful improvements which simplify and greatly speed up the taking of X-ray pictures or radiographs of human subjects, particularly in connection with X-ray survey work for the detection of tuberculosis and of other chest lesions. The invention also provides a novel and improved means for positioning successive subjects accurately in a given position for the taking of X-ray photographs of the chest region, substantially regardless of the height of the individual and without requiring adjustment of the height of the apparatus. Another object of the invention is the provision of a radiographic accessory by which successive subjects may be radiographed rapidly and without prolonged preliminary attention on the part of the operator of the radiographic equipment.

Heretofore, the apparatus for taking radiographs of the chest, particularly for the early detection of tuberculosis, have required that the X-ray generator and cassette be moved up or down to accommodate subjects of different heights so as to secure a uniform location of the subject on the film or paper used for the radiograph. Other apparatus has provided adjustable pedestals for the subject so that differences in height of successive subjects could be accurately compensated for and the subject could be raised or lowered to bring him into a uniform position with reference to the cassette. Either of these types of equipment requires special attention on the part of the operator to adjust the apparatus for each individual subject, thereby increasing the duties of the operator and slowing down the taking of a series of radiographs. With the present invention, however, a series of subjects can be radiographed in rapid succession without requiring any adjustment of the apparatus regardless of the heights of the successive subjects of normal range of stature.

In accordance with the present invention there is provided a conventional X-ray generator such as is customarily used for chest radiography, and there is also provided a cassette which contains the X-ray sensitive material such as film or paper on which the radiograph is to be recorded. The cassette is supported in a substantially vertical plane, for instance, on the wall of a darkroom, and at about the correct height for taking radiographs of the chest of a normal tall subject, while the X-ray generator is positioned externally of the dark room and at some distance therefrom, and the rays generated by the X-ray generator preferably have their principal axis directed normal to and centrally of a casette. Likewise, the invention is useful in connection with chest fluoroscopy and photofluorography.

Immediately above the cassette, the darkroom wall or other support for the cassette is provided with a recess constructed and adapted to allow the chin and face of the subject to be positioned therein, thereby allowing the subject to stand with his chest comfortably against the light-proof "window" of the cassette, which is transparent to the X-radiation. On the floor, externally of the darkroom and immediately below the cassette there is provided a relatively small platform having a plurality of steps arranged in divergent series, the steps being graduated so that a relatively few steps are provided in the distance corresponding to the difference in height of various normal subjects.

Thus, illustratively, there are two steps in addition to the base or floor, and these steps are conveniently of about four inches each, making a total height of eight inches which corresponds roughly to the normal variation in the height of individuals, for instance, from five foot four inches to six foot.

The subject stands with his feet on the floor, or on the intermediate step or the top step depending upon his height, places his chin in the recess and leans so as to press his chest firmly against the window or outer face of the cassette, flexing his knees more or less so that his chin rests on the lower surface of the recess, thereby accurately locating his chest both with respect to the cassette and the central axis of the X-radiation.

It will be understood that the foregoing general description and the following detailed description as well, are exemplary and explanatory of the invention but are not restrictive thereof.

Referring now in detail to the illustrative embodiment of the invention as shown in the accompanying drawings, the X-ray apparatus comprises a conventional X-ray tube 10, or other source of X-radiation, a darkroom 11 having an outer wall 12. Exteriorly of the outer wall is provided a window 13 of Bakelite or aluminum or other lightproof material transparent to X-radiation. Suitably supported within the darkroom is a roll of sensitized material 14 which is led downwardly past the window 13, and the material is exposed in suitable sized areas such as 14 inches by 17 inches, corresponding to the normal size of chest radiographs. Immediately behind the window 13 is provided a pressure plate 16 which holds the sensitized material in exposure position against the Bakelite window 13, the pressure plate 16 being urged against the sensitized surface of the paper or other ray sensitive medium by means of springs 18.

The wall 12 of the darkroom, as well as the pressure plate 16, are preferably provided with conventional lead shielding, and the face of the pressure plate 16 adjacent the sensitized surface of the material 14 may be provided with a conventional intensifying screen in order to reduce the time of exposure necessary.

Immediately above the upper edge of the window 13, the wall 12 of the darkroom is formed with an inwardly and upwardly directed ledge 20 which merges into an upwardly and outwardly directed member 21, providing a recess 22 to receive the chin and face of the subject to be X-rayed, and due to the relatively small variation in the lengths of necks of various individuals, the positioning of a subject's chain against the inclined surface 20 insures that his chest will be properly postioned with respect to the window 13 of the cassette.

In order to permit the individual to stand at ease with his chest in the proper location with respect to the cassette window 13, a pedestal is provided on the floor adjacent the outer wall 12, and immediately below the cassette. The preferred form of this pedestal 24 is illustrated in detail in Figure 2 and comprises an upper step 25 of a width sufficient to accommodate the feet of the subject when they are close together. At either side of the upper step 25 is an intermediate step 26, one for the right foot and the other for the subject's left foot, and these steps 26 are at the same height and preferably of a sufficient width for a single foot. The steps 26 are preferably about four inches below the step 25, and are also about four inches above the base 27 of the pedestal, giving an overall height of about eight inches to the pedestal.

A relatively short subject may thus stand with both his feet on the upper step 25, a subject of medium height may stand with his feet on the steps 26, and a relatively tall subject may spread his feet further apart and stand on the floor. By flexing his knees, the subject may adjust his height comfortably until his chin rests against the inclined surface 20, thereby accurately, rapidly and comfortably positioning himself properly with reference both to the beam of X-rays and the area of sensitive material 4 to be exposed.

Figure 3 of the drawing illustrates a modified embodiment of the invention in which the pedestal comprises divergent series of steps supported on a base. As illustrated, there is provided a base 30 of relatively thin plywood or other suitable material having a central portion 32 of sufficient width to receive both the subject's feet. At either side of the space 32 is an L-shaped block 33 having a step 34 and a higher step 35, the steps 34 being closer to each other than the steps 35. In use, a tall subject will stand with his feet in the space 32; and a subject of moderate height may stand on the steps 34; while a relatively short subject may stand with one foot on one step 35 and his other foot on the other step 35.

As with the previously described embodiment, intermediate variations in the heights of various subjects may be compensated for by flexure of the knees or by slight stretching of the body until the subject's chin is comfortably located against the inclined surface 20 of the recess 22.

Thus, the present invention provides an apparatus for radiography of a large number of subjects of widely varying height, such as are always encountered in chest survey work, and no adjustment of the apparatus whatsoever is required from one subject to the next, and in actual practice it has been found possible to make excellent, accurately positioned radiographs as rapidly as two or three per minute.

The invention in its broader aspects is not limited to the specific mechanisms shown and described but departures may be made therefrom within the scope of the accompanying claims without departing from the principles of the invention and without sacrificing its chief advantages.

What I claim is:

1. In radiographic apparatus, the combination of an X-ray generator, a vertically disposed cassette and a pedestal below the cassette on which the subject stands, said pedestal comprising a pair of divergent series of parallel steps arranged at different heights.

2. In radiagraphic apparatus, the combination of an X-ray generator, a vertically disposed cassette and a pedestal below the cassette on which the subject stands, said pedestal comprising a pair of divergent series of parallel steps arranged at different heights, the central step being sufficiently wide to accommodate both of the subject's feet and the interval between the steps of each series being about four inches in height.

3. In radiographic apparatus, the combination of an X-ray generator, a vertically disposed cassette and a pedestal below the cassette on which the subject stands, said pedestal comprising a pair of divergent series of parallel steps arranged at different heights, the central step being uppermost and sufficiently wide to accommodate both of the subject's feet and the steps being about four inches in height from each other.

4. In radiographic apparatus, the combination of an X-ray generator, a vertical wall having a cassette mounted thereon, a pedestal below the cassette on which the subject stands with his chest against the cassette and a recess above the cassette to receive the subject's chin, said pedestal comprising a plurality of steps at different heights whereby the subject may position his chest correctly by choosing the steps on which he stands.

5. In radiographic apparatus, the combination of an X-ray generator, a vertical wall having a cassette mounted thereon, a pedestal below the cassette on which the subject stands with his chest against the cassette and a recess above the cassette to receive the subject's chin, said pedestal comprising a central wide step, and a plurality of narrower steps at the sides thereof, said steps being vertically spaced from the central step to provide for different heights of the subject's feet from the floor with a substantially uniform position of the chest and chin.

FRANK T. POWERS.